United States Patent [19]

Miller

[11] Patent Number: 4,563,914
[45] Date of Patent: Jan. 14, 1986

[54] CONTINUOUSLY VARIABLE TRANSMISSION WITH AUXILIARY DRIVE

[75] Inventor: Moshe Miller, Jerusalem, Israel

[73] Assignee: Industries Development Corporation (International Services), Tel-Aviv, Israel

[21] Appl. No.: 456,551

[22] Filed: Jan. 10, 1983

[30] Foreign Application Priority Data

Jan. 10, 1982 [IL] Israel .......................................... 64739

[51] Int. Cl.⁴ .............................................. F16H 47/04
[52] U.S. Cl. ......................................... 74/687; 74/572; 74/681; 74/793
[58] Field of Search ................. 74/687, 793, 681, 675, 74/751, 572; 180/165; 60/716, 718

[56] References Cited

U.S. PATENT DOCUMENTS

| | | | |
|---|---|---|---|
| 3,055,233 | 9/1962 | Giles | 74/687 |
| 3,665,788 | 5/1972 | Nyman | 74/687 X |
| 3,988,949 | 11/1976 | Weseloh et al. | 74/687 |
| 4,110,982 | 9/1978 | Regar | 74/572 X |
| 4,126,200 | 11/1978 | Miller et al. | 74/751 X |
| 4,171,029 | 10/1979 | Beale | 74/751 X |
| 4,471,668 | 9/1984 | Elsner | 74/687 |

FOREIGN PATENT DOCUMENTS 2641886  3/1978  Fed. Rep. of Germany ...... 180/165

Primary Examiner—Leslie A. Braun
Assistant Examiner—Joseph M. Rolnicki
Attorney, Agent, or Firm—Curtis, Morris & Safford

[57] ABSTRACT

A continuously variable transmission with auxiliary drive, such as a flywheel and including first and second continuously variable transmission components, a planetary differential, selectable coupling apparatus having a first apparatus operative in a first mode of operation for connecting the planetary to the flywheel and to the continuous variable transmission in a first manner and a second apparatus operative in a second mode of operation for connecting the planetary to the flywheel and to the continuously variable transmission in a second manner.

4 Claims, 30 Drawing Figures

CONTINUOUSLY VARIABLE TRANSMISSION WITH AUXILIARY DRIVE

FIELD OF THE INVENTION

The present invention relates to vehicle drive systems and more particularly to vehicle drive systems employing kinetic energy storage and a continuously variable transmission.

BACKGROUND OF THE INVENTION

Various types of vehicle drive systems are known in the patent literature and are presently in use. Among these are systems which employ various types of gearing to effectively extend the operating range of a continuously variable transmission. Such systems may include both a source of rotational energy such as a heat engine, and kinetic energy storage such as a flywheel. The flywheel and source of rotational energy may be connected to the continuously variable transmission and to the drive output of the vehicle in a number of selectable modes which correspond to different effective gear ratios encountered in the operation of a vehicle. Such a system is shown in U.S. Pat. No. 4,126,200.

SUMMARY OF THE INVENTION

The present invention relates to a vehicle drive system suitable for use with a vehicle including a rotational energy source such as a heat engine, and a flywheel. In accordance with a preferred embodiment of the invention there is provided vehicle drive apparatus comprising:

first and second continuously variable transmission components;

power transfer means communicating between the first and second continuously variable transmission components;

differential means including a sun, a carrier and a ring;

selectable coupling means comprising;

first means, operative in a first mode of operation to couple:
1. a rotational energy source and a flywheel to the carrier;
2. the sun to the first continuously variable transmission component; and
3. the ring to the second continuously variable transmission component and to the drive wheels of the vehicle;

second means operative in a second mode of operation to connect:
1. the flywheel to the ring;
2. the ring to the second continuously variable transmission component;
3. the first continuously variable transmission component to the sun; and
4. the rotational energy source and the carrier to the drive wheels of the vehicle.

Further in accordance with a preferred embodiment of the invention there is a provided vehicle drive apparatus comprising:

first and second continuously variable transmission components;

power transfer means communicating between the first and second continuously variable transmission components;

differential means including a sun, a carrier and a ring;

selectable coupling means comprising:

primary means, operative in a primary mode of operation to couple:
1. a rotational energy source and a flywheel to the carrier;
2. the ring to the second continuously variable transmission component; and
3. the sun to the first continuously variable transmission component and to the drive wheels of the vehicle;

first means, operative in a first mode of operation to couple:
1. the rotational energy source and the flywheel to the carrier;
2. the sun to the first continuously variable transmission component; and
3. the ring to the second continuously variable transmission component and to the drive wheels of the vehicle;

second means, operative in a second mode of operation to connect:
1. the flywheel to the ring;
2. the ring to the second continuously variable transmission component;
3. the first continuously variable transmission component to the sun; and
4. the rotational energy source to the carrier and to the drive wheels of the vehicle.

Further in accordance with a preferred embodiment of the invention there is provided vehicle drive apparatus comprising:

first and second continuously variable transmission components;

power transfer means communicating between the first and second continuously variable transmission components;

differential means including a sun, a carrier and a ring;

selectable coupling means comprising:

first means, operative in a first mode of operation to couple:
1. a rotational energy source and a flywheel to the carrier;
2. the ring to the first continuously variable transmission component and to the drive wheels of the vehicle;

second means, operative in a second mode of operation to connect:
1. the flywheel to the sun;
2. the sun to the second continuously variable transmission component;
3. the first continuously variable transmission component to the ring; and
4. the rotational energy source and the carrier to the drive wheels of the vehicle.

Further in accordance with a preferred embodiment of the invention there is provided vehicle drive apparatus comprising:

first and second continuously variable transmission components;

power transfer means communicating between the first and second continuously variable transmission components;

differential means including a sun, a carrier and a ring;

selectable coupling means comprising:

primary means, operative in a primary mode of operation to couple:
1. a rotational energy source and a flywheel to the carrier;
2. the sun to the second continuously variable transmission component; and
3. the ring to the first continuously variable transmission component and to the drive wheels of the vehicle;

first means, operative in a first mode of operation to couple:
1. the rotational energy source and the flywheel to the carrier;
2. the ring to the first continuously variable transmission component; and
3. the sun to the second continuously variable transmission component and to the drive wheels of the vehicle;

second means, operative in a second mode of operation to connect:
1. the flywheel to the sun;
2. the sun to the second continuously variable transmission component;
3. the first continuously variable transmission component to the ring; and
4. the rotational energy source to the carrier and to the drive wheels of the vehicle.

Further in accordance with a preferred embodiment of the invention there is provided vehicle drive apparatus comprising:
first and second continuously variable transmission components;
power transfer means communicating between the first and second continuously variable transmission components;
differential means including a sun, a carrier and a ring;
selectable coupling means comprising:
primary means, operative in a primary mode of operation to couple:
1. a rotational energy source and a flywheel to the sun;
2. the ring to the second continuously variable transmission component; and
3. the carrier to the first continuously variable transmission component and to the drive wheels of the vehicle;

first means, operative in a first mode of operation to couple:
1. the rotational energy source and the flywheel to the sun;
2. the carrier to the first continuously variable transmission component; and
3. the ring to the second continuously variable transmission component and to the drive wheels of the vehicle;

second means, operative in a second mode of operation to connect:
1. the flywheel to the ring;
2. the ring to the second continuously variable transmission component;
3. the first continuously variable transmission component to the carrier; and
4. the rotational energy source to the sun and to the drive wheels of the vehicle.

Further in accordance with a preferred embodiment of the invention there is provided vehicle drive apparatus comprising:

first and second continuously variable transmission components;
power transfer means communicating between the first and second continuously variable transmission components;
differential means including a sun, a carrier, and a ring;
selectable coupling means comprising:
primary means, operative in a primary mode of operation to couple:
1. a rotational energy source and a flywheel to the sun;
2. the carrier to the second continuously variable transmission component; and
3. the ring to the first continuously variable transmission component and to the drive wheels of the vehicle;

first means, operative in a first mode of operation to couple:
1. The rotational energy source and the flywheel to the sun;
2. the ring to the first continuously variable transmission component; and
3. the carrier to the second continuously variable transmission component and to the drive wheels of the vehicle;

second means, operative in a second mode of operation to connect:
1. the flywheel to the carrier:
2. the carrier to the second continuously variable transmission component;
3. the first continuously variable transmission component to the wheels of the vehicle.

Further in accordance with a preferred embodiment of the invention there is provided vehicle drive apparatus comprising:
first and second continuously variable transmission components;
power transfer means communicating between the first and second continuously variable transmission components;
differential means including a sun, a carrier and a ring;
selectable coupling means comprising:
primary means, operative in a primary mode of operation to couple:
1. a rotational energy source and a flywheel to the ring;
2. the sun to the second continuously variable transmission component; and
3. the carrier to the first continuously variable transmission component and to the drive wheels of the vehicle;

first means, operative in a first mode of operation to couple:
1. the rotational energy source and the flywheel to the ring;
2. the carrier to the first continuously variable transmission component; and
3. the sun to the second continuously variable transmission component and to the drive wheels of the vehicle;

second means, operative in a second mode of operation to connect:
1. the flywheel to the sun;
2. the sun to the second continuously variable transmission component;

3. the first continuously variable transmission component to the carrier; and
4. the rotational energy source to the ring and to the drive wheels of the vehicle.

Further in accordance with a preferred embodiment of the invention there is provided vehicle drive apparatus comprising:

first and second continuously variable transmission components;

power transfer means communicating between the first and second continuously variable transmission components;

differential means including a sun, a carrier and a ring;

selectable coupling means comprising:

primary means, operative in a primary mode of operation to couple:
1. a rotational energy source and a flywheel to the ring;
2. the carrier to the second continuously variable transmission component; and
3. the sun to the first continuously variable transmission component and to the drive wheels of the vehicle;

first means, operative in a first mode of operation to couple:
1. the rotational energy source and the flywheel to the ring;
2. the sun to the first continuously variable transmission component; and
3. the carrier to the second continuously variable transmission component and to the drive wheels of the vehicle;

second means, operative in a second mode of operation to connect:
1. the flywheel to the carrier;
2. the carrier to the second continuously variable transmission component;
3. the first continuously variable transmission component to the sun; and
4. the rotational energy source to the ring and to the drive wheels of the vehicle.

BRIEF DESCRIPTION OF THE DRAWINGS

The present invention will be more fully understood from the following detailed description taken in conjunction with the drawings in which.

DETAILED DESCRIPTION OF THE INVENTION

Figure 1A:
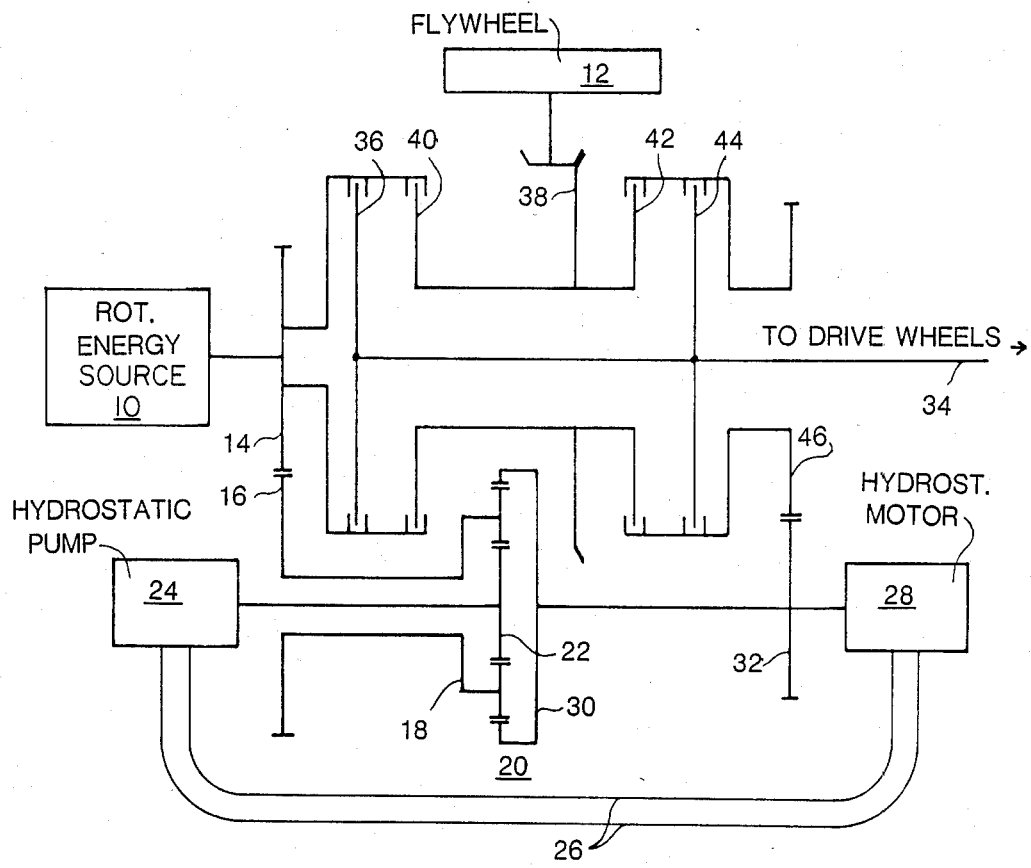
FIG. 1A is a schematic illustration of the vehicle drive apparatus constructed and operative in accordance with an embodiment of the present invention.

Reference is now made to FIG. 1A which illustrates vehicle drive apparatus constructed and operative in accordance with an embodiment of the invention and comprising a rotational energy source 10 such as a heat engine, and a flywheel 12, which is engergized by the engine 10 directly or from the kinetic energy of the drive wheels. The rotational energy source 10 is connected via gears 14 and 16 to the carrier 18 of a differential 20. The differential 20, which may be a conventional planetary differential, also comprises a sun 22 which is fixedly connected to a first continuously variable transmission component 24 which comprises, in the illustrated embodiment, an hydrostatic pump. The hydrostatic pump is coupled via power transfer means 26, here hydraulic conduits, to a second continuously variable transmission component 28, here a hydrostatic motor. The hydrostatic pump and motor may be identical.

It is a particular feature of the illustrated embodiment that the hydrostatic pump and motor may be entirely separate and need not be physically associated with each other other than via the hydraulic conduits. Thus each of the hydrostatic transmission components may be operated up to its own maximum speed. This enables maximum advantage to be taken of each hydrostatic component and provides great flexibility in the design of the transmission.

The hydrostatic motor which defines the second continuously variable transmission component 28 is fixedly coupled to the ring 30 of differential 20 and is also provided with gearing 32 fixedly associated therewith.

The rotational output of the heat engine 10 is selectably connected directly to the drive wheels of a vehicle via a drive shaft 34 and a clutch 36. The flywheel 12 is fixedly coupled to gearing 38 which is selectably coupled, in turn, via a clutch 40 and gears 14 and 16 to the carrier 18 of the differential 20. A clutch 42 selectably couples the second continuously variable transmission component 28 to the flywheel 12 via gears 46 and 32 while a clutch 44 selectably couples the second continuously variable transmission component 28 to the drive shaft 34 via gears 32 and 46.

Figure 1B:
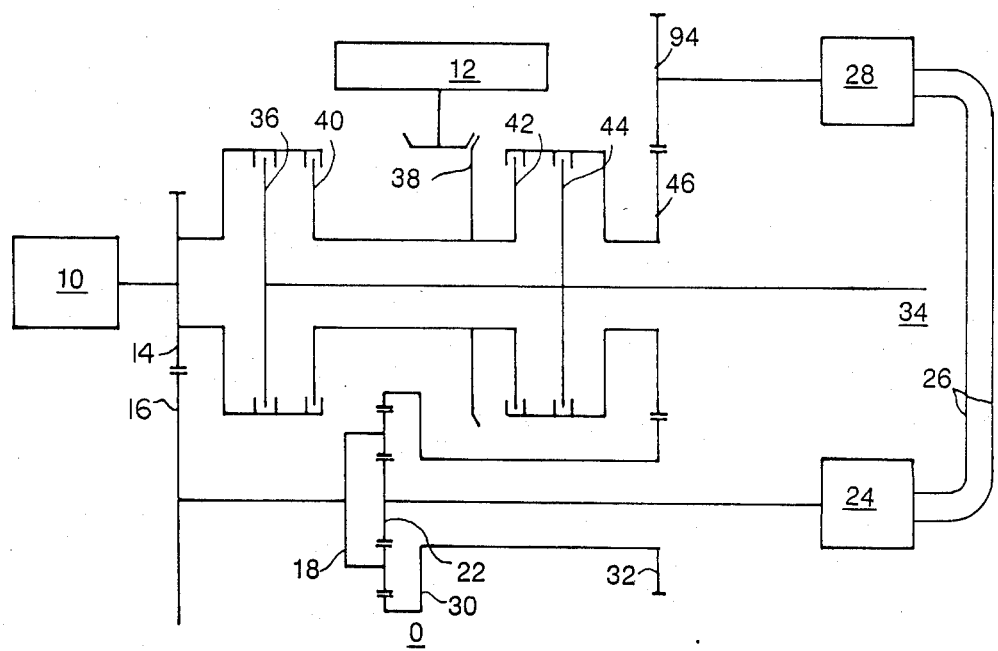
FIG. 1B is a schematic illustration of an alternative embodiment of vehicle drive apparatus.

FIG. 1B illustrates an alternative embodiment of the apparatus of FIG. 1A in which a three shaft construction is provided.

Figure 2:
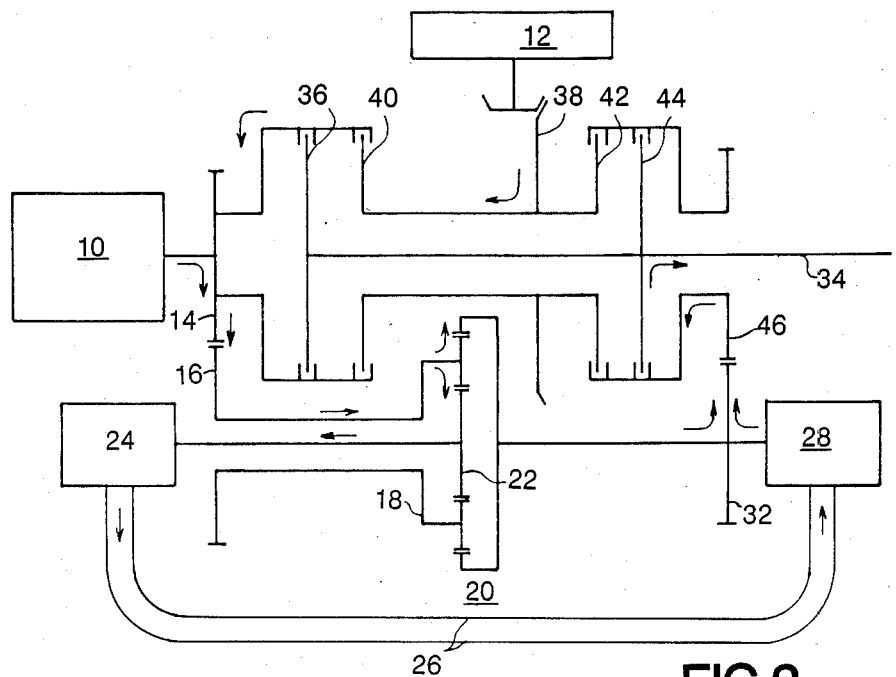
FIG. 2 is an illustration of the apparatus of FIG. 1A arranged for first mode operation.

Reference is now made to FIG. 2 which illustrates the arrangement of the clutches for first mode operation. It may be seen that for first mode operation clutch 40 is engaged thus coupling the flywheel 12 and the rotational energy source 10 together and to the carrier 18 while clutch 36 is disengaged. Similarly clutch 42 is disengaged while clutch 44 is engaged, thus coupling the second continuously variable transmission component 28 to the drive wheels of the vehicle via the drive shaft 34.

The arrows indicate the direction of power flow when there is no circulating hydrostatic power. This is the case for all of the figures appearing herein.

Figure 3:
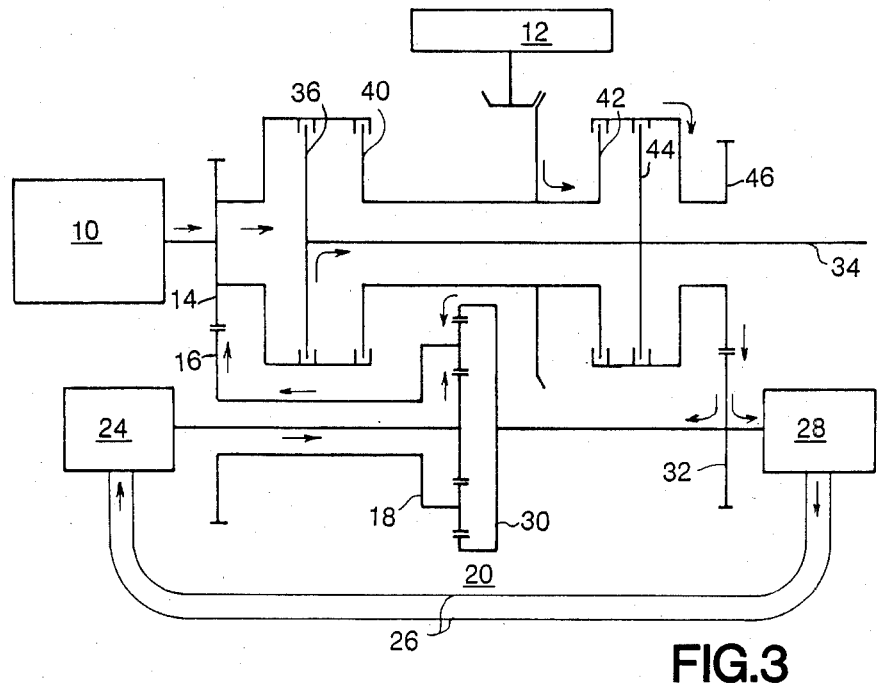
FIG. 3 is an illustration of the apparatus of FIG. 1A arranged for a second mode or operation.

Reference is now made additionally to FIG. 3 which illustrates the clutch arrangement for second mode operation. It is seen that in this mode clutch 40 is open thus decoupling the flywheel 12 from the rotational energy source 10. Clutch 42 is engaged thus coupling the flywheel 12 to the second continuously variable transmission component 28 and to the ring 30 of the differential 20. Clutch 36 is engaged thus coupling the source of rotational energy 10 directly to the drive shaft 34 of the vehicle as well as coupling the carrier 18 to drive shaft 34 of the vehicle.

It may be appreciated that in accordance with the present invention the effective range of ratios over which the continuously variable transmission components defined here by the hydrostatic pump and motor is effectively doubled by the two mode operation of the vehicle drive apparatus constructed and operative in accordance with an embodiment of the invention.

It may also be appreciated that through suitable selection of the diameters of gears 14 and 16, and 32 and 46, the speed differences across clutches 40 and 36, and across clutches 42 and 44 are essentially zero when the change is made between first mode and second mode operation.

It may also be appreciated that in second mode operation, the power produced by the heat engine is transmitted directly, and hence at very high efficiency, to the drive shaft of the vehicle.

It may further be appreciated that through suitable selection of the gear ratios of gearing 38 and gears 14 and 16, the engine will rotate at low speed, and hence very efficiently, in the low vehicle speed mode 1 operation and will increase in speed in proportion to the increase in vehicle speed in the higher speed mode 2 operation. Thus, as the power requirement of the vehicle increases with increasing speed, the power output of the engine also increases.

The construction illustrated and described hereinabove in connection with FIGS. 1 and 4 has a number of advantages over the prior art amplified in U.S. Pat. No. 4,126,200. These advantages are as follows:

It will be appreciated that there are several advantages of using a differential for power splitting as opposed to the type of hydrostatic transmission described in U.S. Pat. No. 4,126,200. Among these advantages are the possibility of using any type of conventionally obtainable hydrostatic units. In essence, the differential splits the power flow into a hydrostatic path through the hydrostatic elements and a mechanical path external to the hydrostatic elements. The power splitting transmission referred to in U.S. Pat. No. 4,126,200 splits the power internally. By suitable selection of the ratios of the differential, output torque may be multiplied over the entire range of operation in the first mode. In the internal power splitting transmission, the output torque decreases whenever there is circulating hydrostatic power. By allowing increased output torque, the hydrostatic transmission can operate at lower pressure, and hence higher efficiency, or perhaps, a smaller hydrostatic unit may be employed.

Additional advantages of the present invention include the possibility of construction thereof with either two shafts as illustrated hereinabove in FIG. 1, or alternatively in a three shaft configuration such as that illustrated in FIG. 4 which will be described hereinafter.

Another advantage of the present invention as illustrated in FIG. 1A is the possibility of using uniform size clutches for all the applications in the transmission, thereby reducing the costs of construction.

Figure 4:
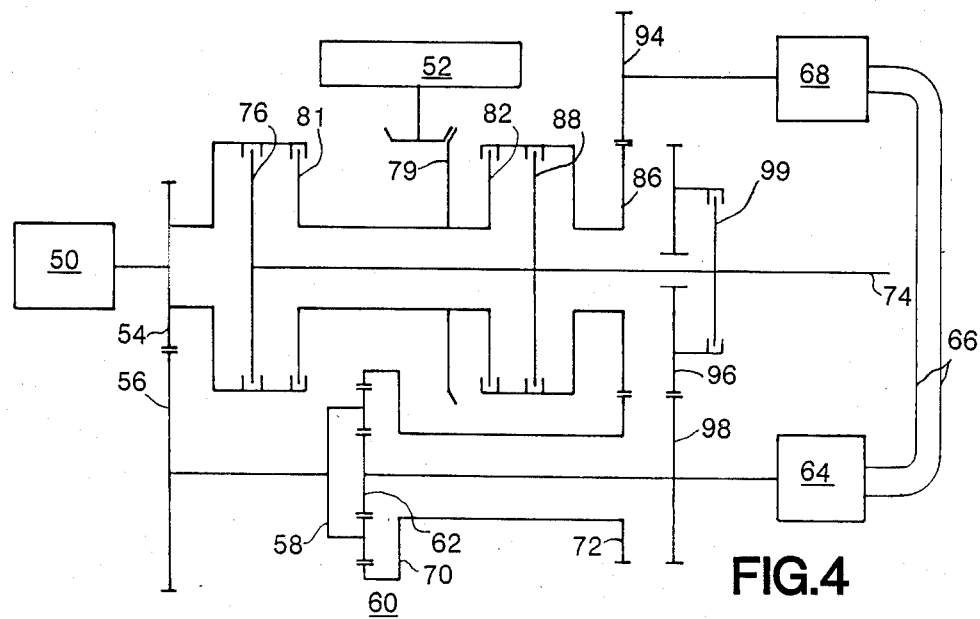
FIG. 4 is an illustration of an alternative embodiment of the vehicle drive apparatus of the present invention.

Reference is now made to FIG. 4 which illustrates an alternative embodiment of the invention comprising a rotational energy source 50 such as a heat engine and a flywheel 52. The rotational energy source 50 is connected via gearing including gears 54 and 56 to the carrier 58 of a differential 60. The differential, which may be a conventional planetary differential, also comprises a sun 62 which is fixedly connected to a first continuously variable transmission component 64 which comprises, in the illustrated embodiment, a hydrostatic pump. The hydrostatic pump is coupled via power transmission means 66, here hydraulic conduits, to a second continuously variable transmission component 68, here a hydrostatic motor.

Similarly to Fig. 1A, it is a particular feature of the illustrated embodiment that the hydrostatic pump and motor may be entirely separate and need not be physically associated with each other than via the hydraulic conduits. Thus each of the hydrostatic transmission components may be operated up to its own maximum speed. This enables maximum advantage to be taken of each hydrostatic component and provides great flexibility in the design of the transmission.

The hydrostatic motor which defines the second continuously variable transmission component 68 is fixedly coupled to the ring 70 of differential 60 via gears 94, 86 and 72.

The rotational output of the rotational energy source 50 is selectably connected directly to the drive wheels of a vehicle via a drive shaft 74 and a clutch 76. The flywheel 52 is fixedly coupled to gearing 79 which is selectably coupled, in turn, via a clutch 81 and gears 54 and 56 to the carrier 58 of the differential 60. A clutch 82 selectably couples the second continuously variable transmission component 68 to the drive shaft 74 via gears 86 and 94 and couples the ring 70 to the drive shaft 74 via gears 72 and 86. A clutch 99 selectably couples the sun 62 of differential 60 to the drive shaft 74 via gears 96 and 98.

Figure 5:
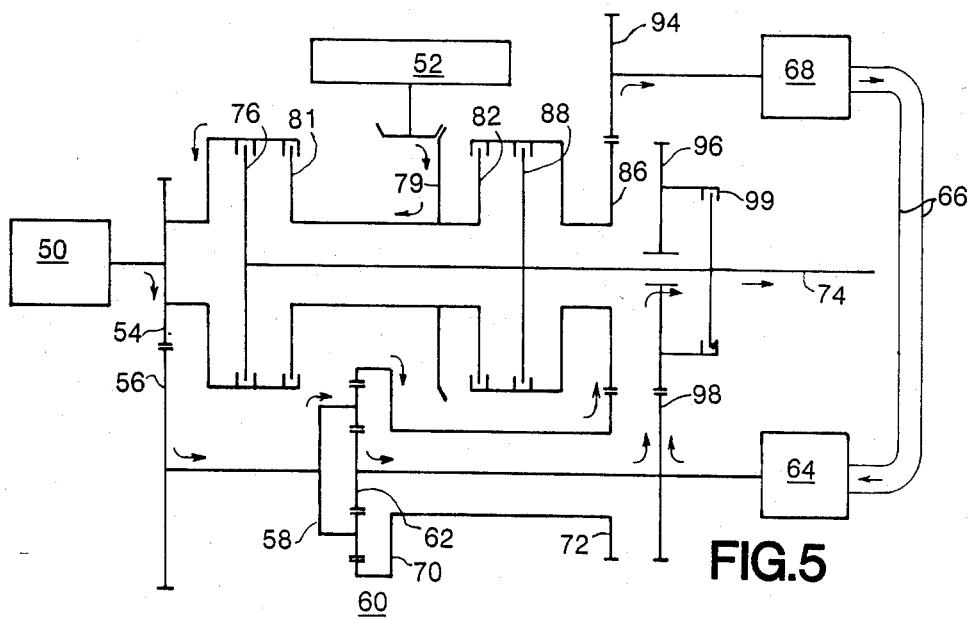
FIG. 5 is an illustration of the embodiment of FIG. 4 arranged for primary mode operation.

Reference is now made to FIG. 5 which illustrates the apparatus of FIG. 4 arranged for primary mode operation. In this operational mode, clutch 81 is closed thus providing connection of the flywheel 52 and the rotational energy source 50 to the carrier 58 of differential 60. The first continuously variable transmission component 64 is connected to the sun 62 of the differential 60 and clutch 99 is closed thus providing connection between the sun 62 and the first continuously variable transmission component 64 to the drive shaft 74 via gears 96 and 98.

Figure 6:
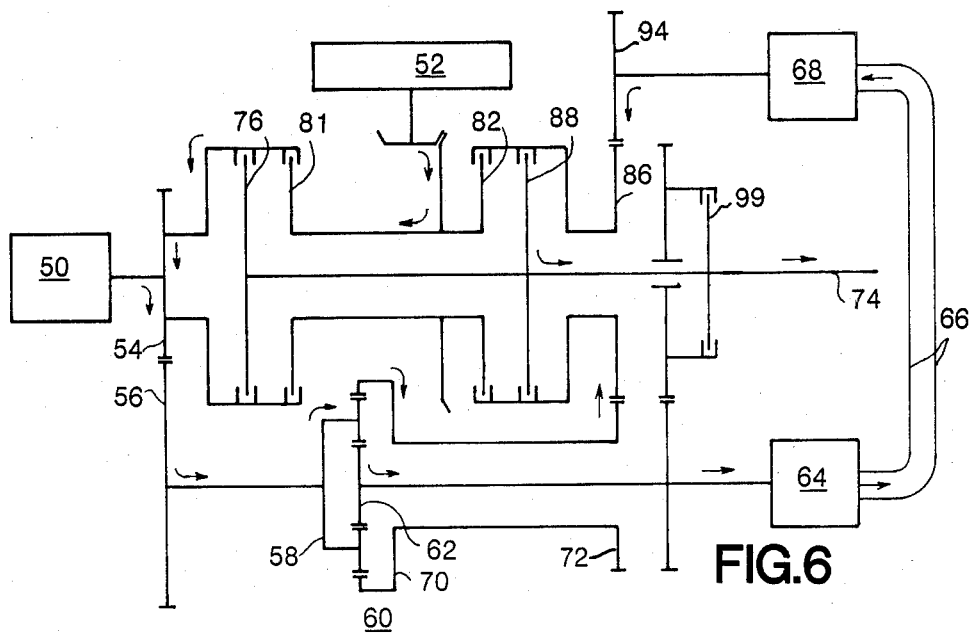
FIG. 6 is an illustration of the embodiment of FIG. 4 arranged for first mode operation.

Reference is now made to FIG. 6 which illustrates operation of the apparatus of FIG. 4 in first mode operation. In this mode of operation, clutch 81 is engaged so that the flywheel 52 and rotational energy source 50 are connected to the carrier 58 of differential 60. The sun 62 of differential 60 is connected to the first continuously variable transmission component 64. Clutch 88 is engaged thus connecting the second continuously variable transmission component 68 to the drive shaft 74 and connecting the ring 70 of differential 60 to the drive shaft 74.

Figure 7:
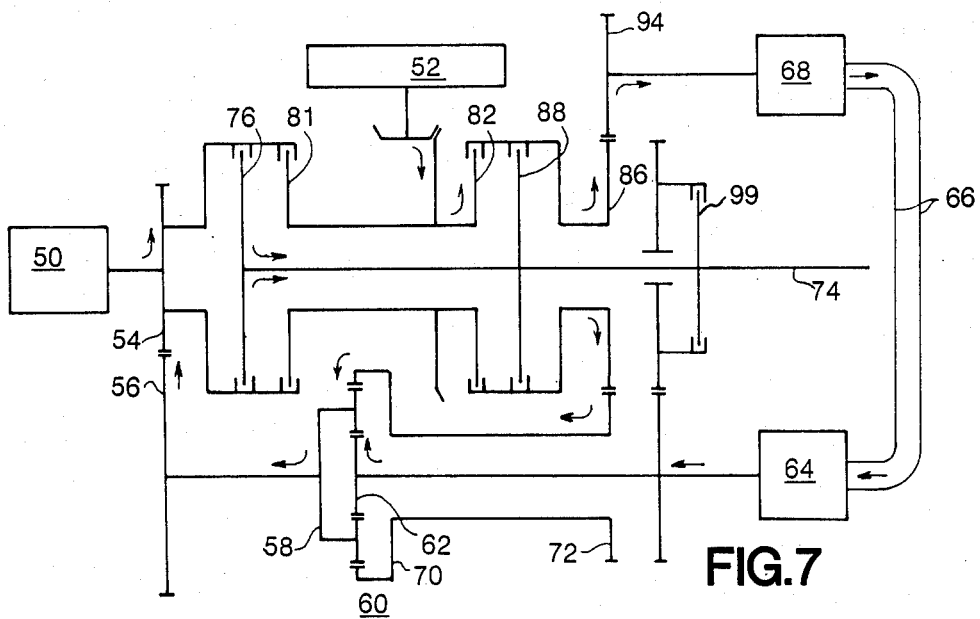
FIG. 7 is an illustration of the embodiment of FIG. 4 arranged for second mode operation.

Reference is now made to FIG. 7 which illustrates the apparatus of FIG. 4 arranged for second mode operation. In this arrangement, clutch 82 is engaged thus connecting the flywheel 52 to the second continuously variable transmission component 68 via gears 86 and 94. The second continuously variable transmission component 68 transmits power to the first continuously variable transmission component 64 via power transfer means 66. The first continuously variable transmission component 64 is connected to the sun 62 of differential 60. Clutch 82 also connects the flywheel 52 to the ring 70 of differential 60 via gears 86 and 72. Clutch 76 is engaged thus connecting the carrier 58 of differential 60 and the rotational energy source 52 to the drive shaft 74.

It will be appreciated that the shift from the first primary mode of operation to the first mode of operation is made when the speed of gear 96 is equal to the speed of gear 86 so that clutches 88 and 99 are in synchronization. It will also be appreciated that the shift from mode 1 operation to mode 2 operation is made when there is substantially zero speed difference across clutches 81 and 76 and across clutches 88 and 82.

The apparatus of FIG. 4 has a number of significant advantages. The most important of these is the provision, in the primary mode, of a high torque output at relatively low vehicle speeds. This is particularly desirable when one attempts to match the very large torque output provided by a vehicle equipped with a conventional automatic transmission with a torque converter at very low vehicle speeds.

Figure 8:
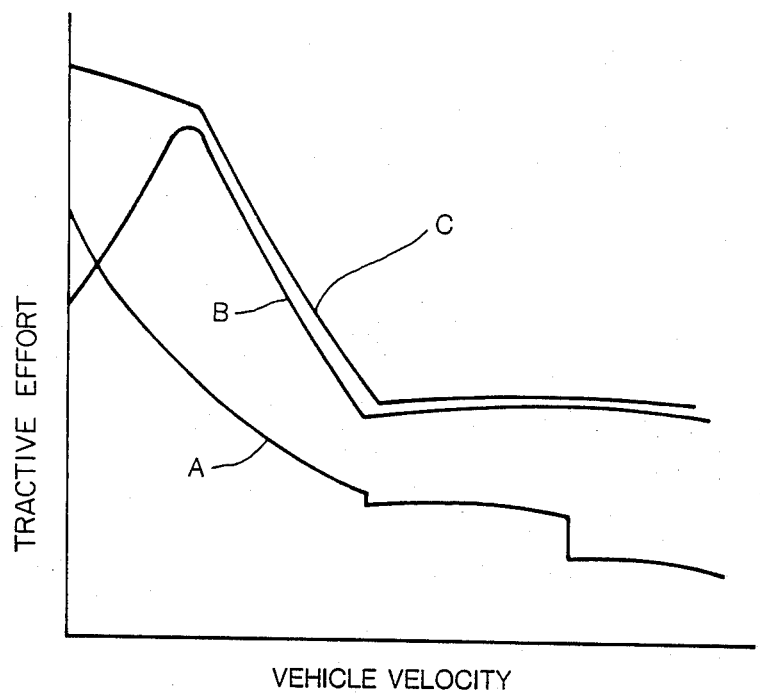
FIG. 8 is a plot of tractive effort versus velocity for the two embodiments of the invention illustrated respectively in FIGS. 1 and 4.

Reference is made in this connection to FIG. 8 which contains two plots of tractive effort versus velocity. Plot A is characteristic of a conventional prior art vehicle containing a conventional automatic transmission with torque converter. Plot B is a plot of tractive effort versus vehicle velocity characteristic of a vehicle having a transmission of the type illustrated in FIG. 1. It is seen that a traction peak is provided at a velocity greater than the lowest range of velocities.

Plot C illustrates a traction versus velocity characteristic for apparatus constructed and operative in accordance with the embodiment illustrated in FIG. 4. Here it is seen that significantly greater traction is provided at the lowest vehicle velocities thus providing the desired traction for vehicle start-up.

The advantage provided by the primary mode of the apparatus of FIG. 4 may be appreciated to result from the additional gear reduction provided by the gears 98 and 96.

The enhanced torque output at low vehicle speeds illustrated by plot C is particularly important since the required torque at low speeds conventionally dictates the size of the hydrostatic transmission components that are employed. Here, as a result, either higher output torques may be obtained using the same size hydrostatic transmissions or, alternatively, smaller size hydrostatic components may be substituted at significant cost saving.

It will be realized that the torque multiplication provided by gear pair 98 and 96 may also be provided by a planetary with the clutch 99 replaced by a brake which fixes the carrier.

Figure 9:
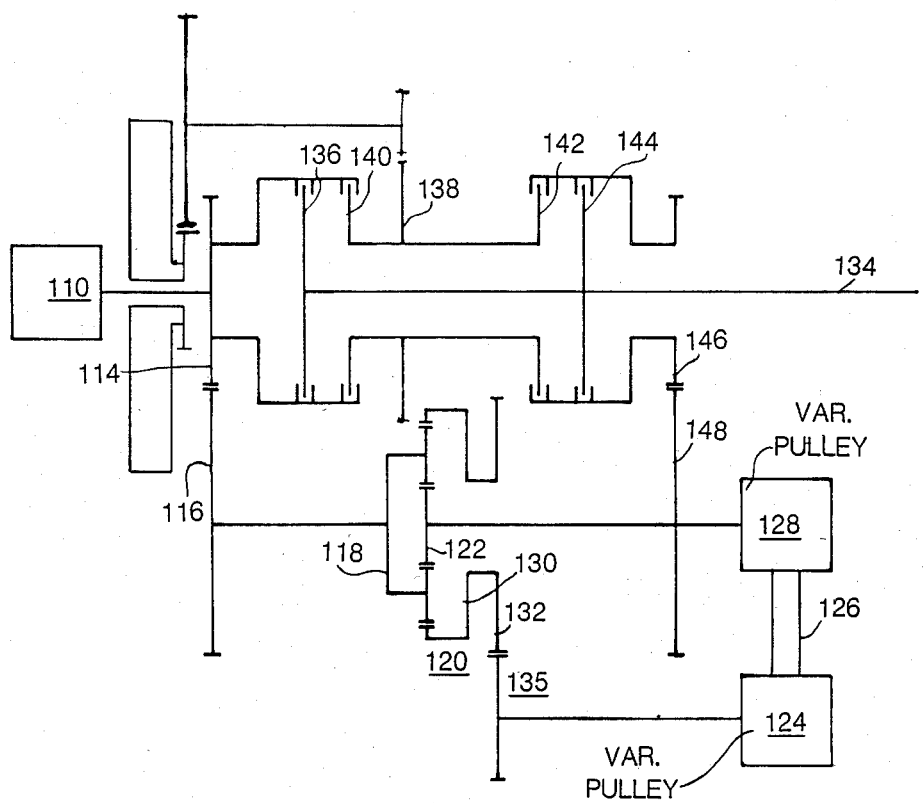
FIG. 9 is an illustration of an alternative embodiment of the vehicle drive apparatus of FIG. 1A.

Reference is now made to FIG. 9 which illustrates the apparatus of FIG. 1B wherein the connections of the sun and the ring are interchanged. Elements that are identical with elements in the FIG. 1B embodiment have the same reference numbers, but raised by 100. Also, in the embodiment of FIG. 9, a belt 126 is employed as the power transfer means and the first continuously variable transmission component 124 is a variable pulley and the second continuously variable transmission component 128 is a variable pulley. The belt 126 may be of the conventional type or of the conventional pushing type.

An additional important advantage of the apparatus of FIG. 4 and FIG. 1B is that the equipment required to achieve the primary mode of operation, gears 98 and 96 and clutch 99, may be added to the rest of the transmission containing the equipment for operation in modes 1 and 2. Hence, for normal applications, a transmission containing equipment for operation in modes 1 and 2 would be provided. If additional starting torque were required in a particular application, the equipment for operation in the primary mode could be added on the same transmission body. Alternatively, the primary mode equipment may be used to allow a higher maximum vehicle speed as in an intercity bus yet still retain good starting torque.

Figure 10:
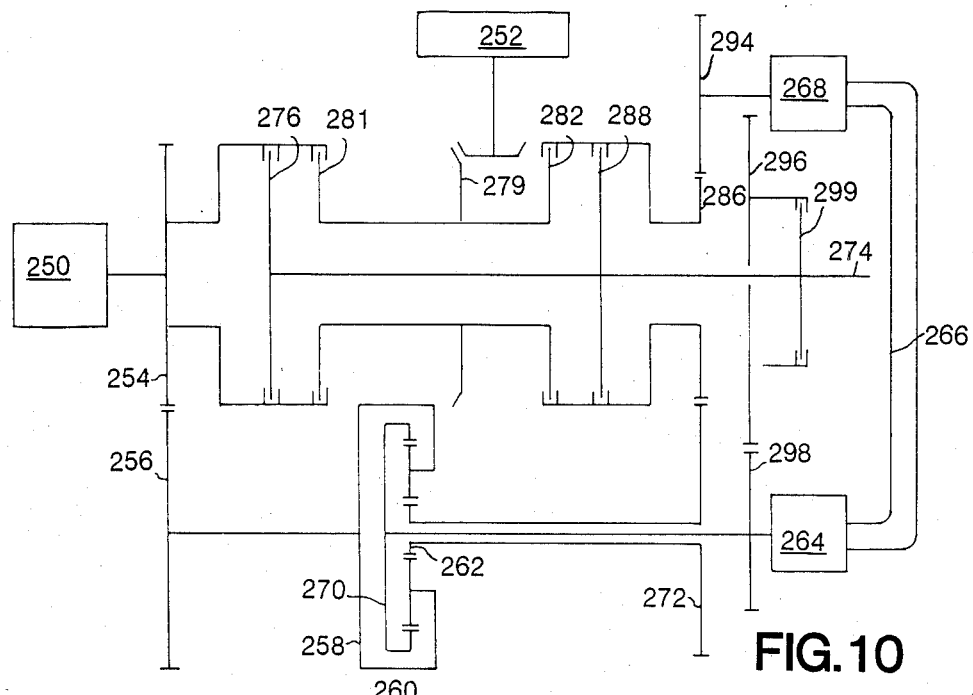
FIG. 10 is an illustration of an alternative embodiment of the apparatus of FIG. 4.

Reference is now made to FIG. 10 which illustrates an alternative embodiment of the apparatus of FIG. 4 in which the connections of the sun and the ring of differential 60 are interchanged. The remainder of the apparatus is identical. For convenience, identical components are identified by the same numbers, the components of the embodiment of FIG. 10 having the prefix "2".

Figure 11:
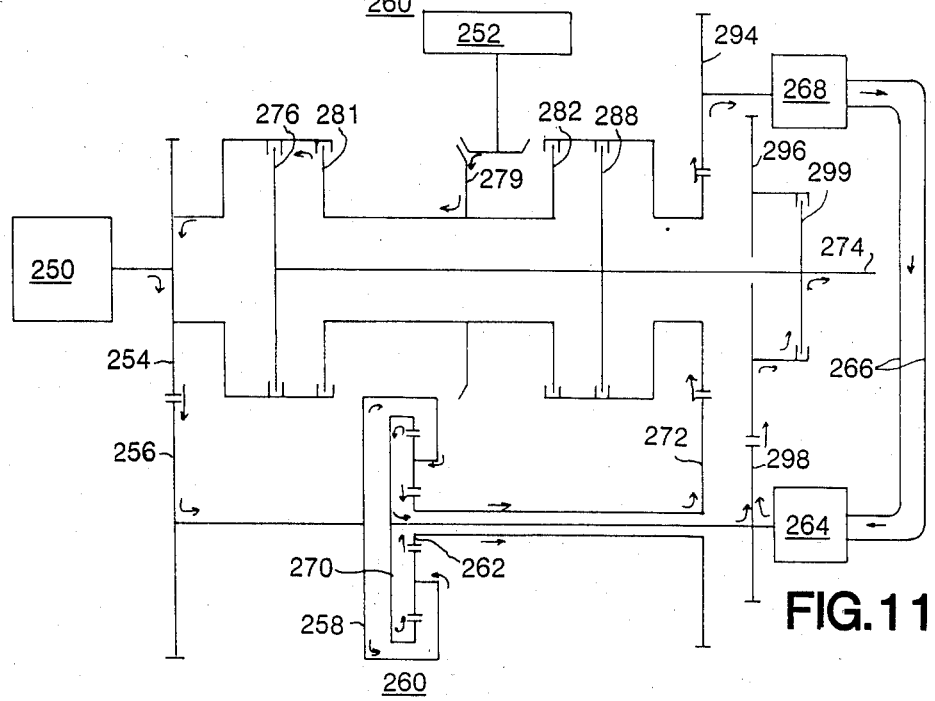
FIG. 11 is an illustration of the apparatus of FIG. 10 arranged for primary mode operation.
Figure 12:
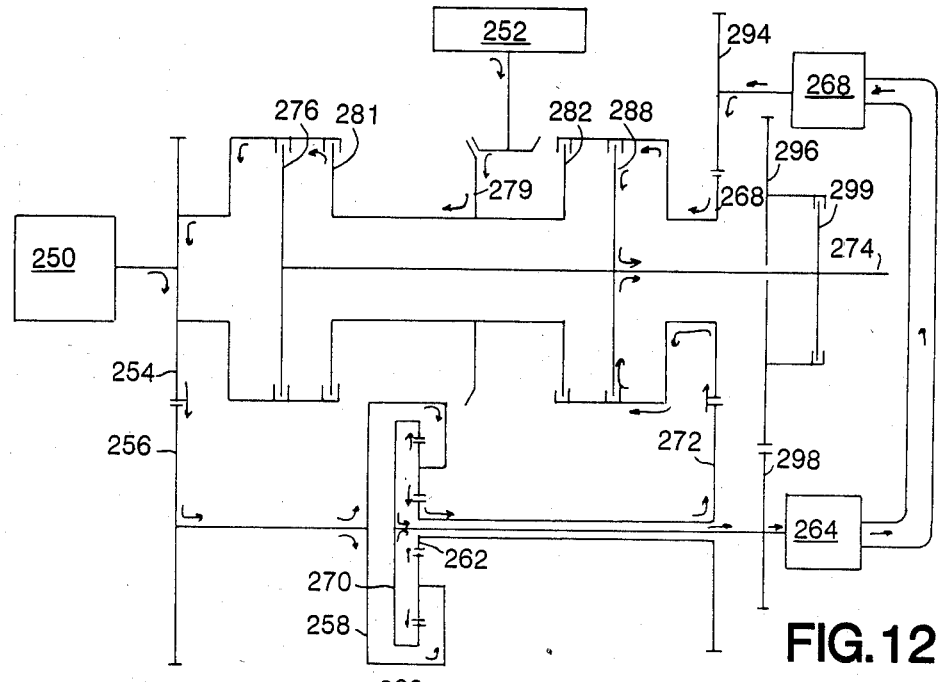
FIG. 12 is an illustration of the apparatus of FIG. 10 arranged for first mode operation.
Figure 13:
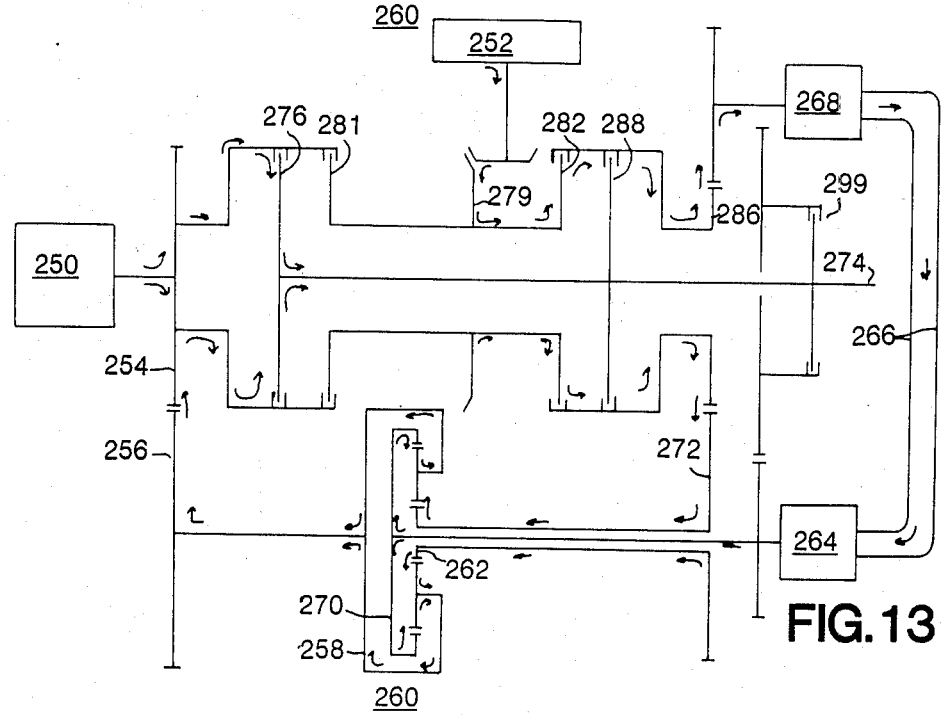
FIG. 13 is an illustration of the apparatus of FIG. 10 arranged for second mode operation.

Reference is now made to FIGS. 11, 12 and 13 which illustrate the embodiment of FIG. 10 arranged respectively for primary, first and second mode operation.

Figure 14:
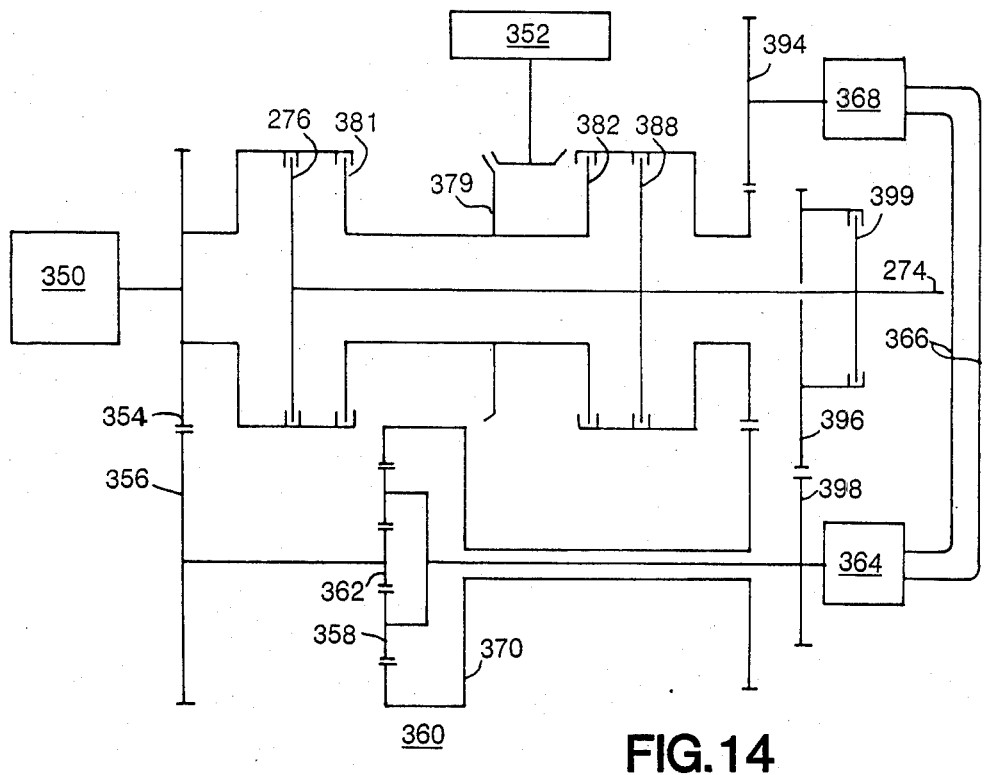
FIG. 14 is an illustration of an alternative embodiment of the apparatus of FIG. 4.

Reference is now made to FIG. 14 which illustrates an alternative embodiment of the apparatus of FIG. 4 in which the connections of the carrier and the sun are interchanged. The remainder of the apparatus is identical. For convenience, identical components are identified by the same numbers, the components of the embodiment of FIG. 14 having the prefix "3".

Figure 15:
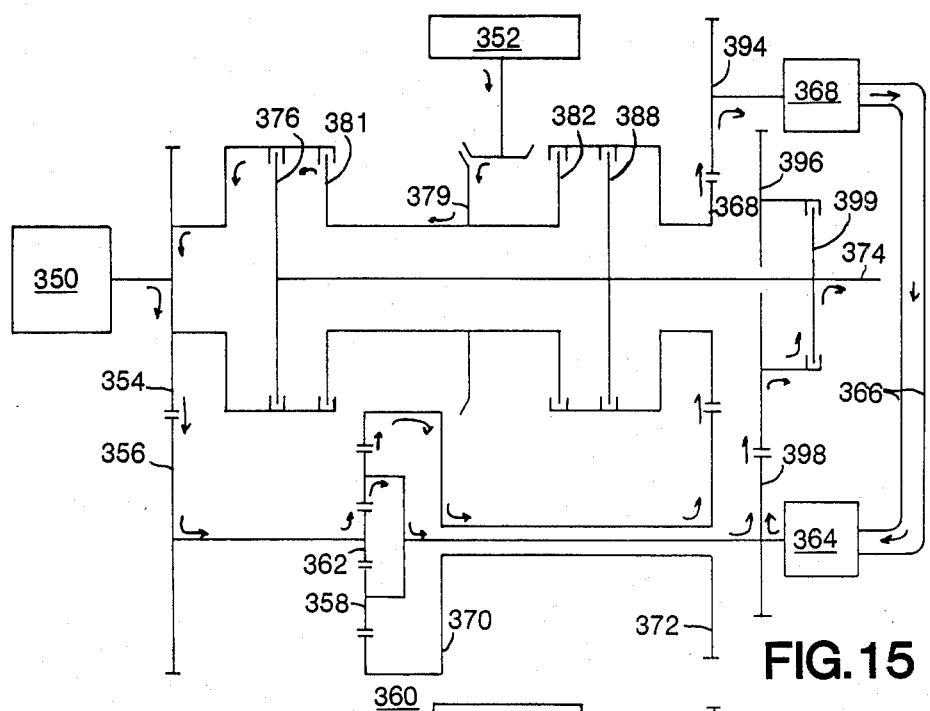
FIG. 15 is an illustration of the apparatus of FIG. 14 arranged for primary mode operation.
Figure 16:
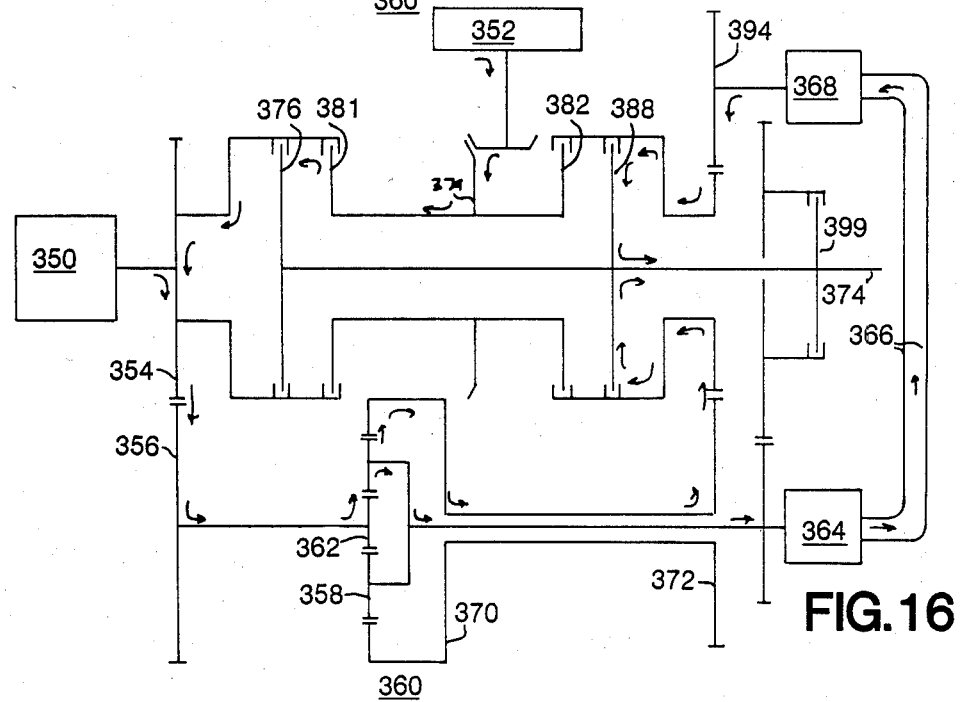
FIG. 16 is an illustration of the apparatus of FIG. 14 arranged for first mode operation.
Figure 17:
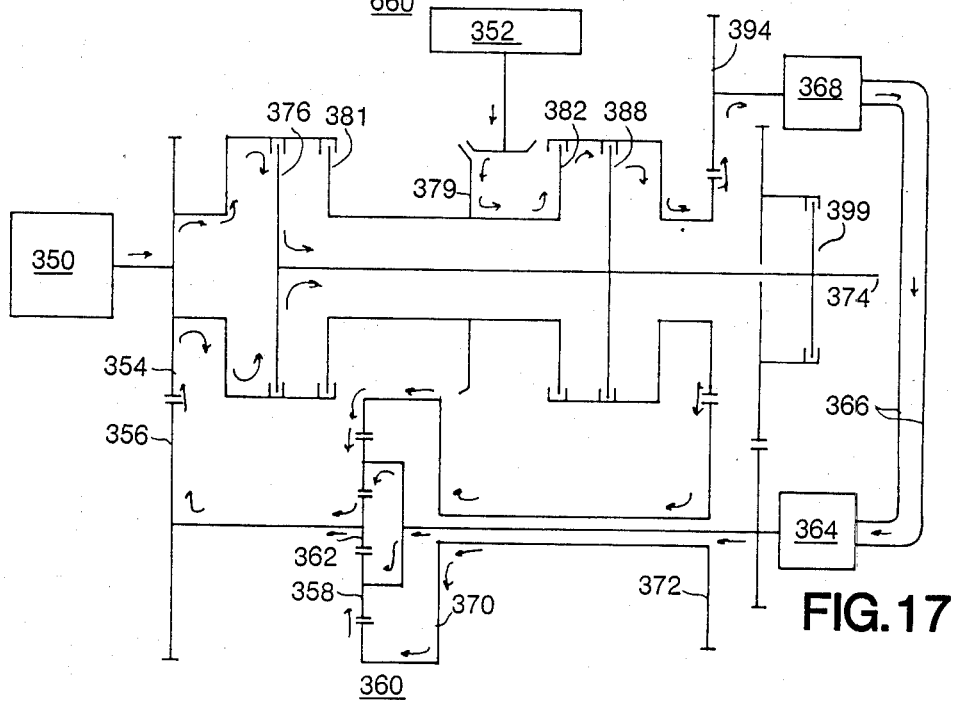
FIG. 17 is an illustration of the apparatus of FIG. 14 arranged for second mode operation.

Reference is now made to FIGS. 15, 16 and 17 which illustrate the embodiment of FIG. 14 arranged respectively for primary, first and second mode operation.

Figure 18:
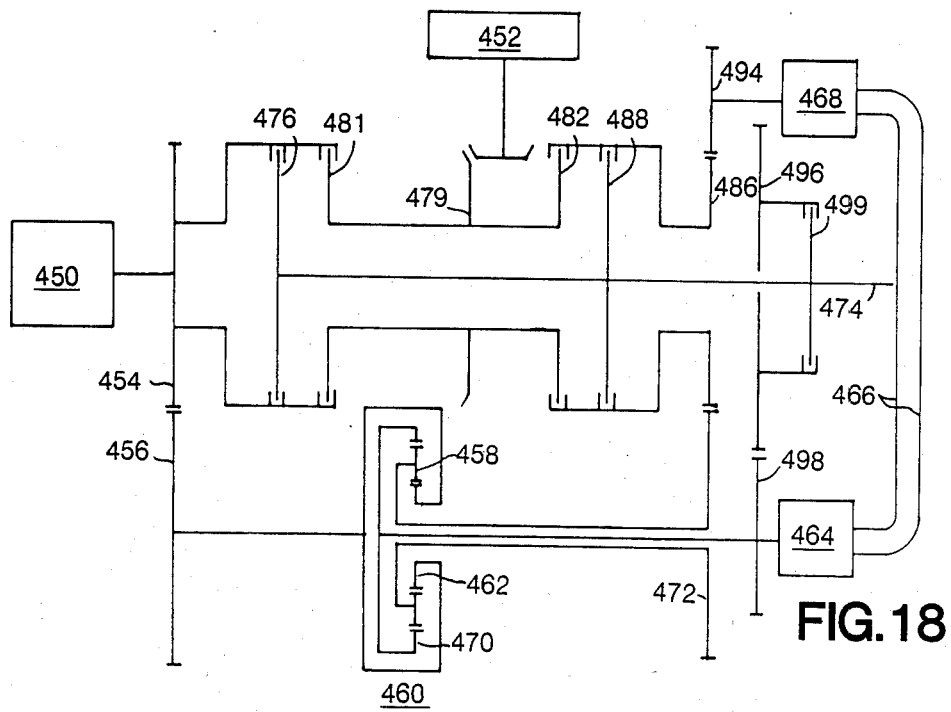
FIG. 18 is an illustration of an alternative embodiment of the apparatus of FIG. 4.

Reference is now made to FIG. 18 which illustrates an alternative embodiment of the apparatus of FIG. 14 in which the connections of the ring and the carrier are interchanged. The remainder of the apparatus is identical. For convenience, identical components are identified by the same numbers, the components of the embodiment of FIG. 18 having the prefix "4".

Figure 19:
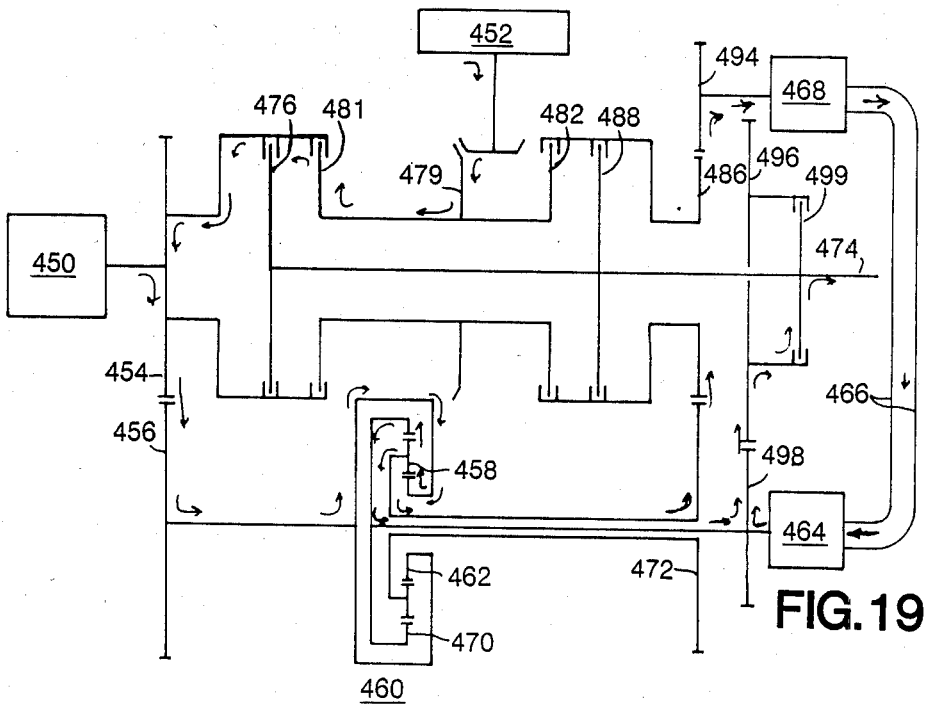
FIG. 19 is an illustration of the apparatus of FIG. 18 arranged for primary mode operation.
Figure 20:
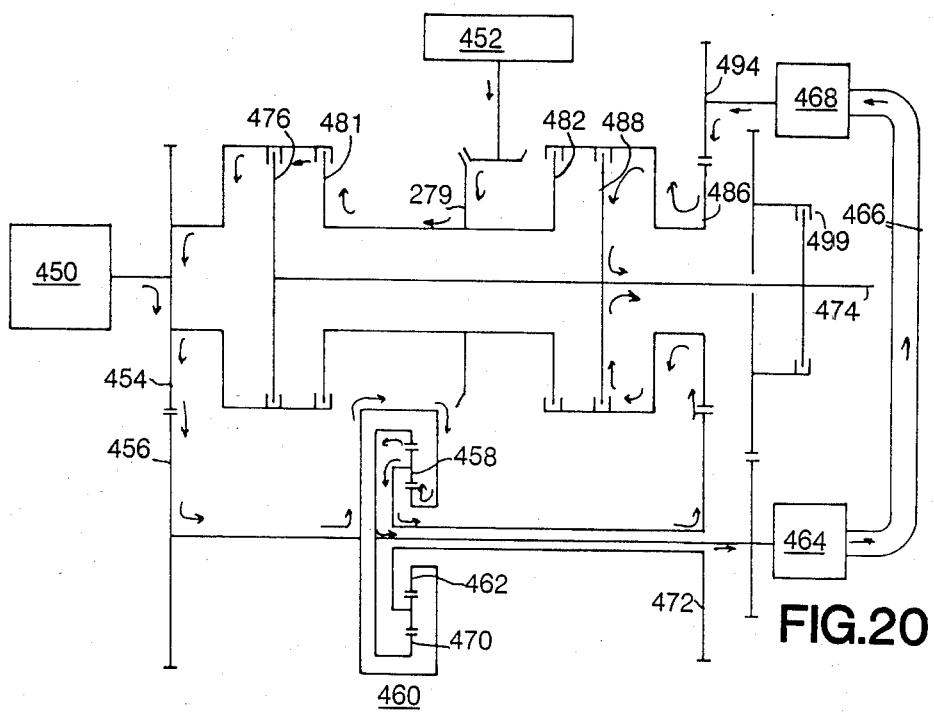
FIG. 20 is an illustration of the apparatus of FIG. 18 arranged for first mode operation.
Figure 21:
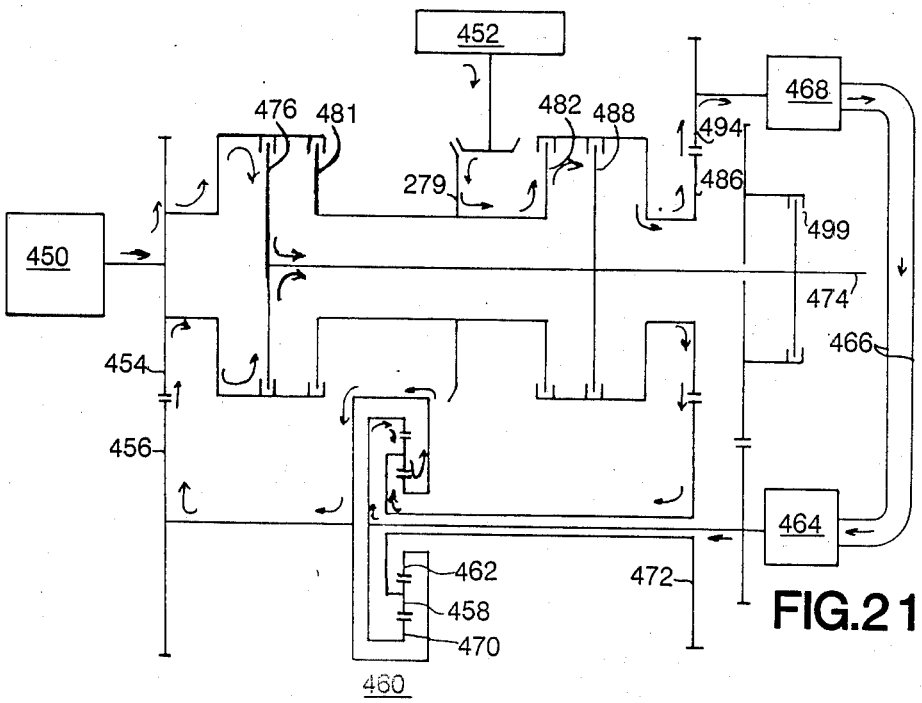
FIG. 21 is an illustration of the apparatus of FIG. 18 arranged for second mode operation.

Reference is now made to FIGS. 19, 20 and 21 which illustrate the embodiment of FIG. 18 arranged respectively for primary, first and second mode operation.

Figure 22:
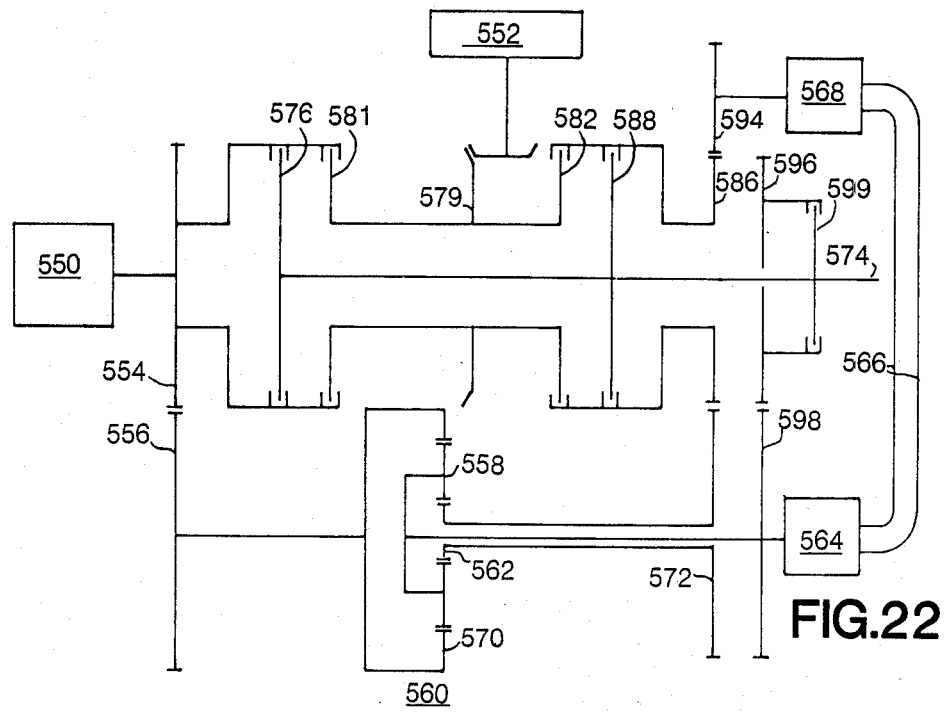
FIG. 22 is an illustration of an alternative embodiment of the apparatus of FIG. 4.

Reference is now made to FIG. 22 which illustrates an alternative embodiment of the apparatus of FIG. 10 in which the connections of the carrier and the ring of differential 60 are interchanged. The remainder of the apparatus is identical. For convenience, identical components are identified by the same numbers, the components of the embodiment of FIG. 22 having the prefix "5".

Figure 23:
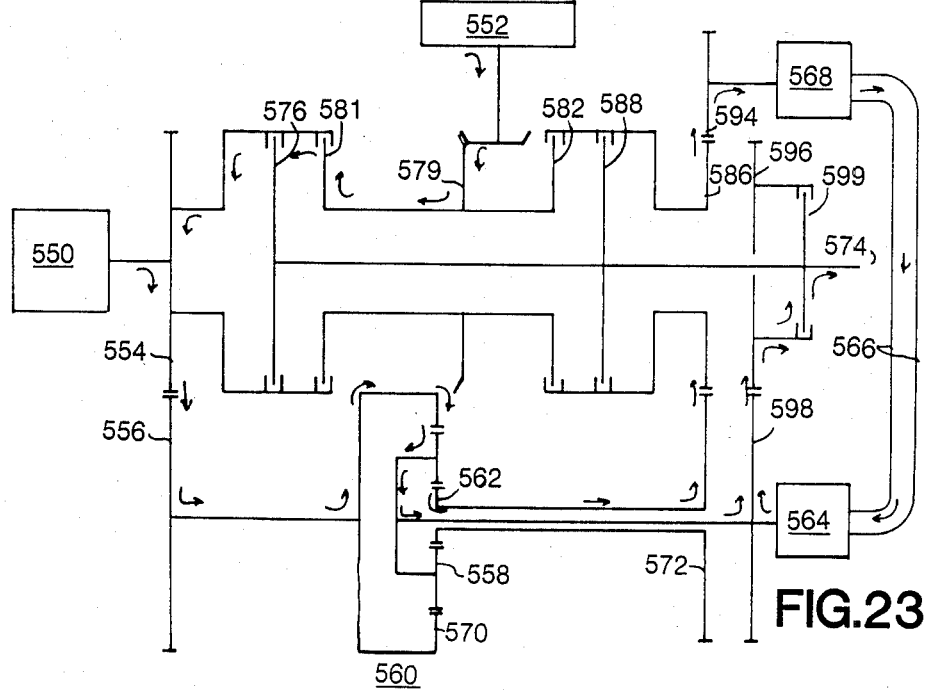
FIG. 23 is an illustration of the apparatus of FIG. 22 arranged for primary mode operation.
Figure 24:
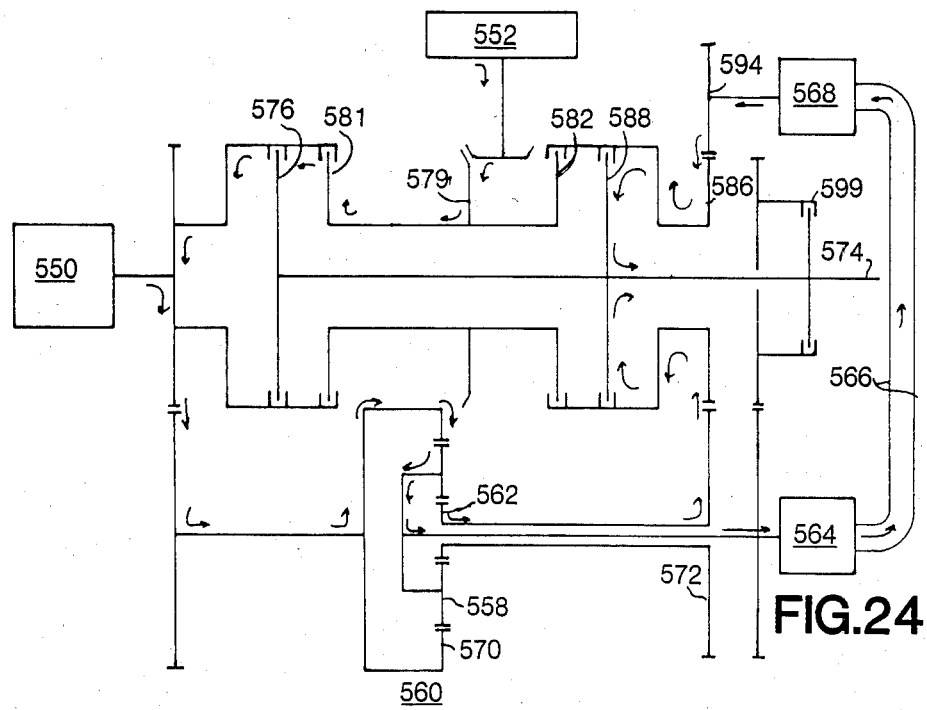
FIG. 24 is an illustration of the apparatus of FIG. 22 arranged for first mode operation.
Figure 25:
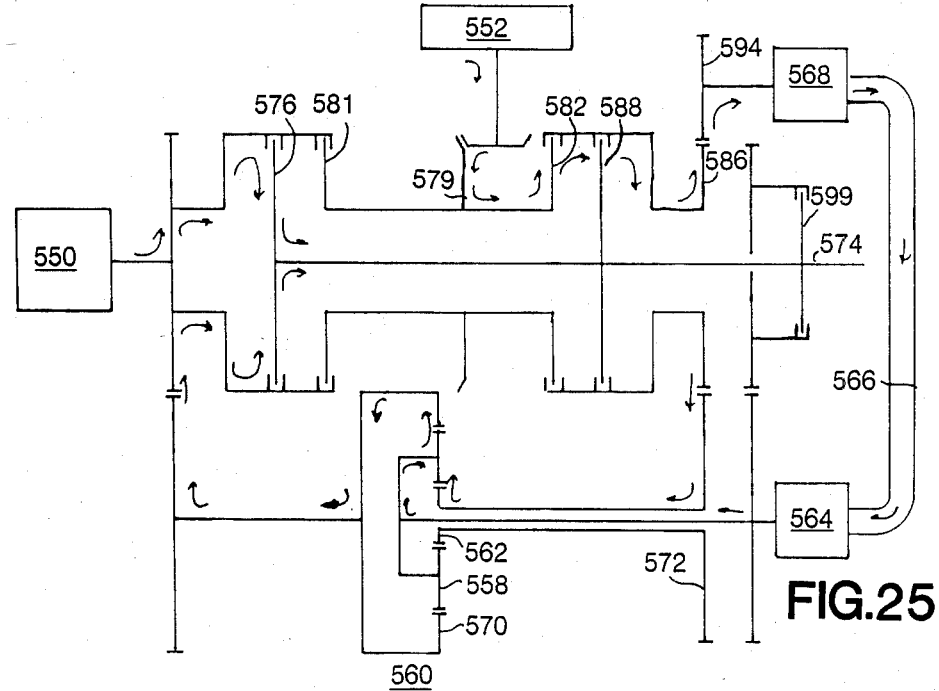
FIG. 25 is an illustration of the apparatus of FIG. 22 arranged for second mode operation.

Reference is now made to FIGS. 23, 24 and 25 which illustrate the embodiment of FIG. 22 arranged respectively for primary, first and second mode operation.

Figure 26:
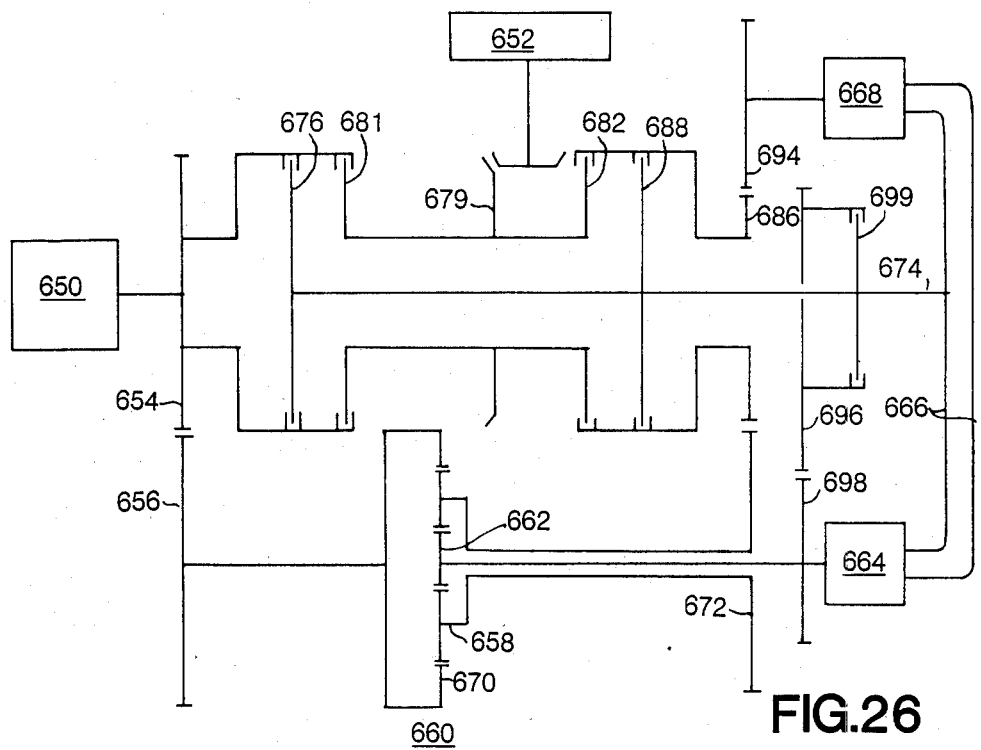
FIG. 26 is an illustration of an alternative embodiment of the apparatus of FIG. 4.

Reference is now made to FIG. 26 which illustrates an alternative embodiment of the apparatus of FIG. 22 in which the connections of the sun and the carrier of differential 60 are interchanged. The remainder of the apparatus is identical. For convenience, identical components are identified by the same numbers, the components of the embodiment of FIG. 26 having the prefix "6".

Figure 29:
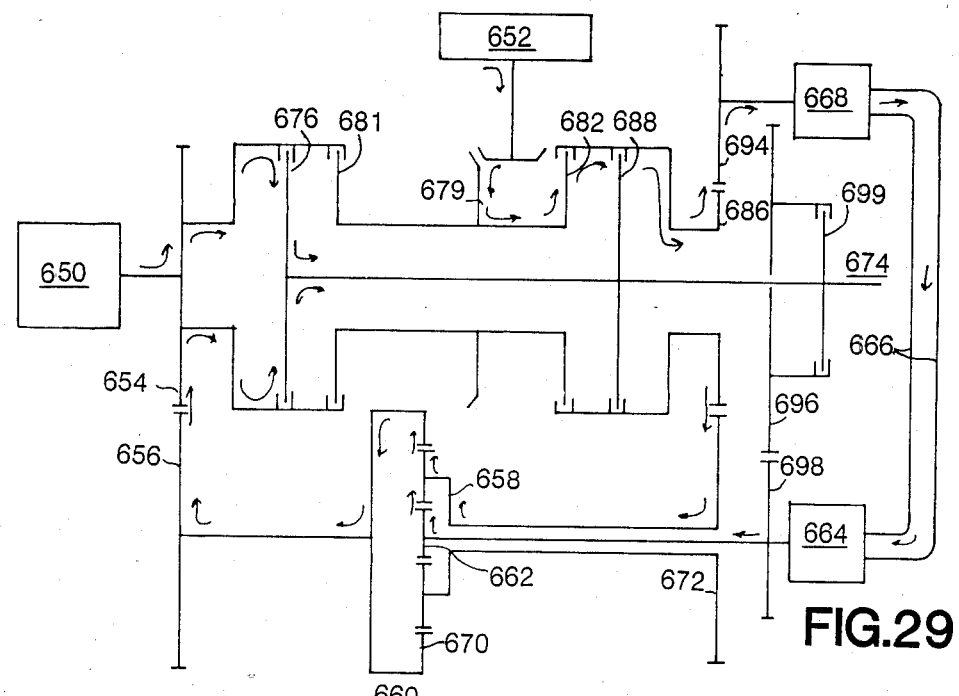
FIG. 29 is an illustration of the apparatus of FIG. 26 arranged for second mode operation.
Figure 27:
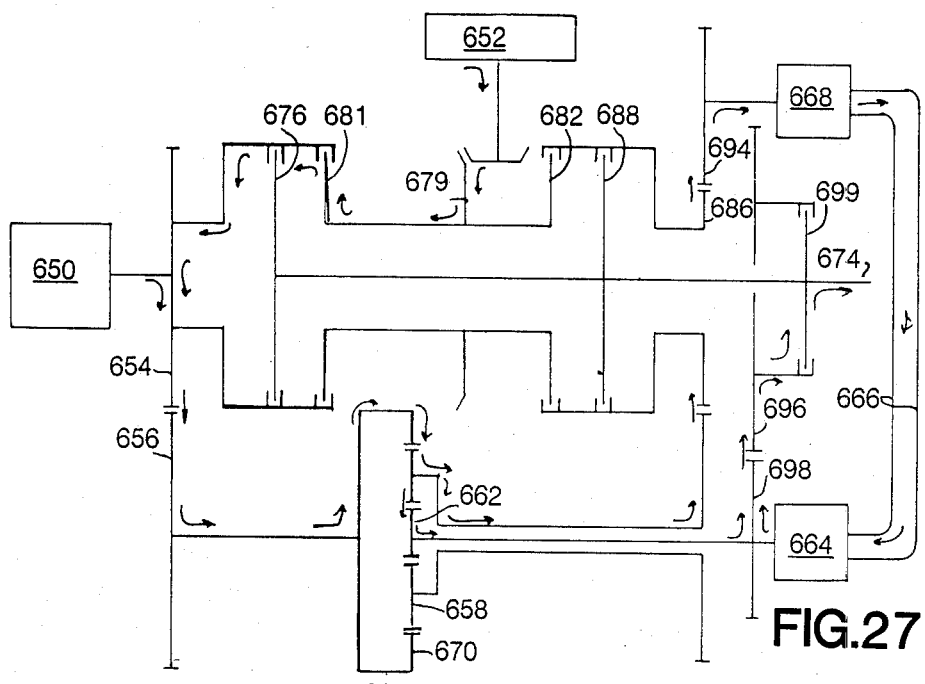
FIG. 27 is an illustration of the apparatus of FIG. 26 arranged for primary mode operation.
Figure 28:
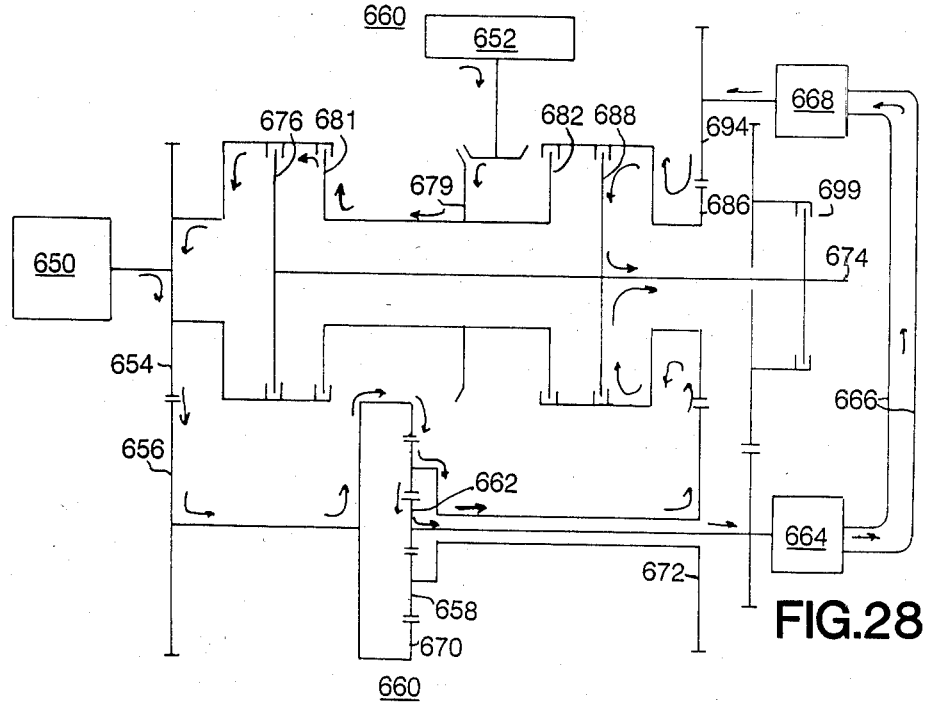
FIG. 28 is an illustration of the apparatus of FIG. 26 arranged for first mode operation.

Reference is now made to FIGS. 27, 28 and 29 which illustrate the embodiment of FIG. 26 arranged respectively for primary, first and second mode operation.

It will be appreciated by persons skilled in the art that the present invention is not limited by what has been particularly shown and described hereinabove. Rather the scope of the present invention is defined only by the claims which follow:

I claim:

1. Drive apparatus for a vehicle having drive wheels, a rotational energy source and a flywheel, said apparatus comprising:
   first and second continuously variable transmission components;
   power transfer means communicating between the first and second continuously variable transmission components;
   differential means including a sun, a carrier and a ring;
   selectable coupling means comprising:
   first and second shaft means, wherein the flywheel is coupled to said first shaft means and the second shaft means is connected to the drive wheels of the vehicle;
   first means, operative is a first mode of operation to couple:
   1. the rotational energy source and the first shaft means to the carrier;
   2. the sun to the first continuously variable transmission component; and
   3. the ring to the second continously variable transmission component and to the second shaft means;
   second means operative in a second mode of operation to connect:
   1. the first shaft means to the ring;
   2. the ring to the second continuously variable transmission component;
   3. the first continuously variable transmission component to the sun; and
   4. the rotational energy source and the carrier to the second shaft means.

2. Drive apparatus for a vehicle having drive wheels, a rotational energy source and a flywheel, said apparatus comprising:
   first and second continuously variable transmission components;
   power transfer means communicating between the first and second continuously variable transmission components;
   differential means including a sun, a carrier and a ring;
   selectable coupling means comprising:
   first and second shaft means, wherein the flywheel is coupled to said first shaft means and the second shaft means is connected to the drive wheels of the vehicle;
   primary means, operative in a primary mode of operation to couple:
   1. the rotational energy source and said shaft means to the carrier;
   2. the ring to the second continuously variable transmission component; and
   3. the sun to the first continuously variable transmission component and to the second shaft means
   first means, operative in a first mode of operation to couple:
   1. the rotational energy source and the first shaft means to the carrier;
   2. the sun to the first continuously variable transmission component; and
   3. the ring to the second continuously variable transmission component and to the second shaft means;
   second means operative in a second mode of operation to connect:
   1. the first shaft means to the ring;
   2. the ring to the second continously variable transmission component;
   3. the first continuously variable transmission component to the sun; and
   4. the rotational energy source to the carrier and to the second shaft means.

3. Drive apparatus for a vehicle having drive wheels, a rotational energy source and a flywheel, said apparatus comprising;
   first and second continuously variable transmission components;
   power transfer means communicating between the first and second continuously variable transmission components;
   differential means including a sun element, a carrier element, and a ring element; and
   selectable coupling means comprising:
   first and second shaft means, wherein the flywheel is coupled to said first shaft means and the second shaft means is connected to the drive wheels of the vehicle;
   first means, operative in a first mode of operation to couple:
   1. the rotational energy source and the first shaft means to a first of said elements;
   2. a second of said elements to the first continuously variable transmission component; and 3. a third of said elements to the second continuously variable transmission component and to the second shaft means; and second means operative in a second mode of operation to couple:
1. the first shaft means to the third element;
2. the third element to the second continuosly variable transmission component;
3. the first continuously variable transmission component to the second element; and
4. the rotational energy source and the first element to the second shaft means.

4. Drive apparatus for a vehicle having drive wheels, a rotational energy source and a flywheel, said apparatus comprising;

first and second continuously variable transmission components;

power transfer means communicating between the first and second continuously variable transmission components;

differential means including a sun element, a carrier element, and a ring element; and selectable coupling means comprising:

first and second means, wherein the flywheel is coupled to said first shaft means and the second shaft means is connected to the drive wheels of the vehicle;

primary means, operative in a primary mode of operation to couple:
1. the rotational energy source and said first shaft means to a first of said elements;
2. a second of said elements to the first continuously variable transmission component and to the second shaft means; and
3. a third of said elements to the second continuously variable transmission component;

first means, operative in a first mode of operation to couple:
1. the rotational energy source and the first shaft means to a first of said elements;
2. a second of said elements to the first continuously variable transmission component; and
3. a third of said elements to the second continuously variable transmission component and to the second shaft means; and second means operative in a second mode of operation to couple:
1. the first shaft means to the third element;
2. the third element to the second continuously variable transmission component;
3. the first continuously variable transmission component to the second element; and
4. the rotational energy source and the first element to the second shaft means.

* * * * *